United States Patent [19]

Shields

[11] 4,256,215
[45] Mar. 17, 1981

[54] APPARATUS FOR ARRANGING AND TRANSPORTING ARTICLES

[76] Inventor: Walter Shields, 181-41 Henley Rd., Jamaica, N.Y. 11432

[21] Appl. No.: 72,729

[22] Filed: Sep. 4, 1979

[51] Int. Cl.³ .............................................. B65G 47/24
[52] U.S. Cl. .................................... 198/407; 198/412; 198/481
[58] Field of Search ............... 198/389, 406, 407, 408, 198/411, 412, 413, 457, 480, 481, 725, 726

[56] References Cited

U.S. PATENT DOCUMENTS

| 1,015,319 | 1/1912 | Jefferies et al. | 198/481 |
|---|---|---|---|
| 3,090,476 | 5/1963 | Sanders | 198/407 |
| 3,104,752 | 9/1963 | Rudszinat et al. | 198/481 |
| 3,521,513 | 7/1970 | Gomann | 198/480 X |
| 3,741,367 | 6/1973 | Castiglioni | 198/389 |
| 4,076,113 | 2/1978 | Shields | 198/480 X |

Primary Examiner—Jeffrey V. Nase
Attorney, Agent, or Firm—Jordan and Hamburg

[57] ABSTRACT

Apparatus for arranging and transporting articles comprises a conveyor for transferring articles to a first position, a first rotation wheel having a plurality of recesses around the outer periphery thereof for consecutively receiving the articles in the recesses from the conveyor at the first position and transferring the articles to a second position angularly displaced from the first position with respect to the axis of the first wheel, and a second rotation wheel having a plurality of recesses around the outer periphery thereof. The second rotation wheel is arranged normal to the first rotation wheel to consecutively receive the articles supported in the recesses of the first wheel at the second position and to transfer the articles to a third position angularly away from the second position with respect to the axis of the second wheel. The articles at the first position transferred by the conveyor are transported to the third position, the orientation of the articles at the third position being transverse to the orientation at the first position.

8 Claims, 11 Drawing Figures

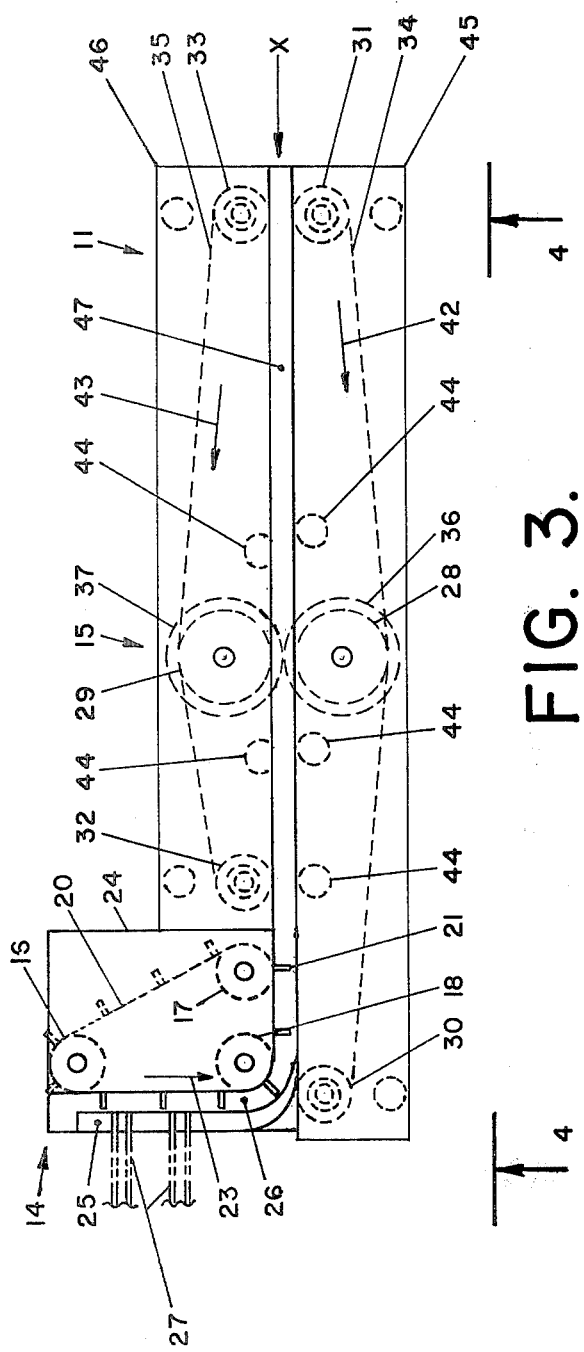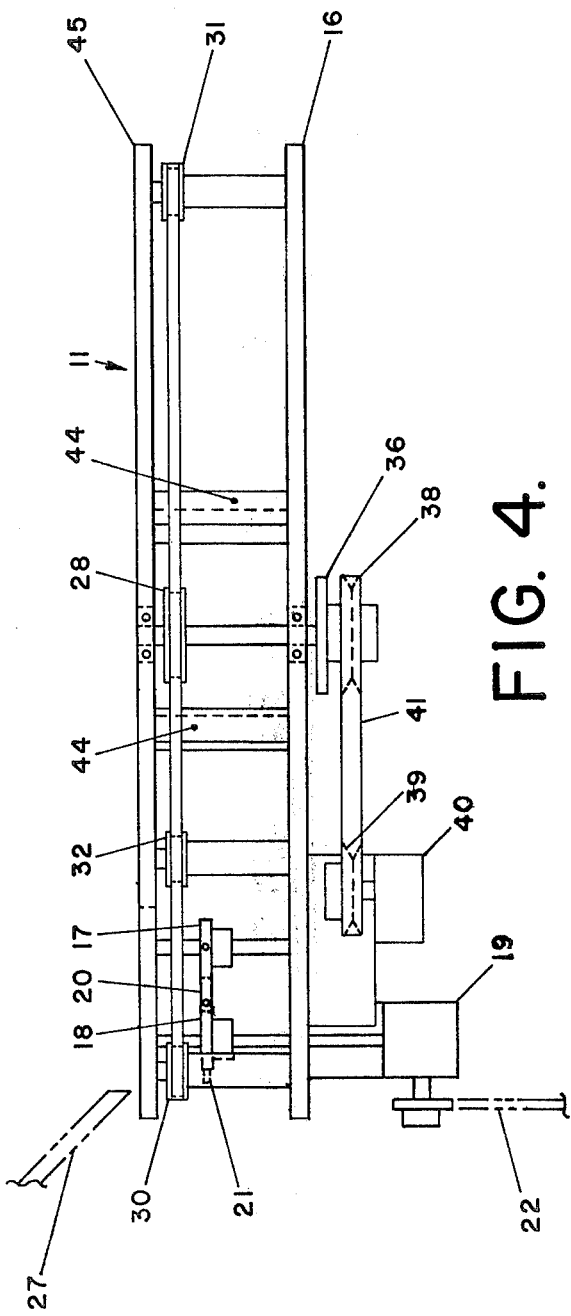

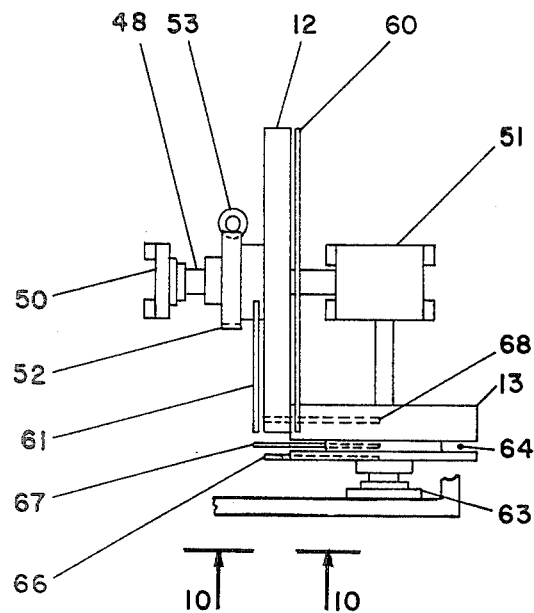
FIG. 5.
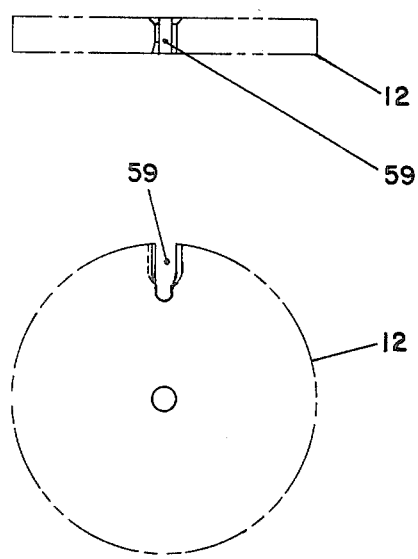
FIG. 7.
FIG. 6.
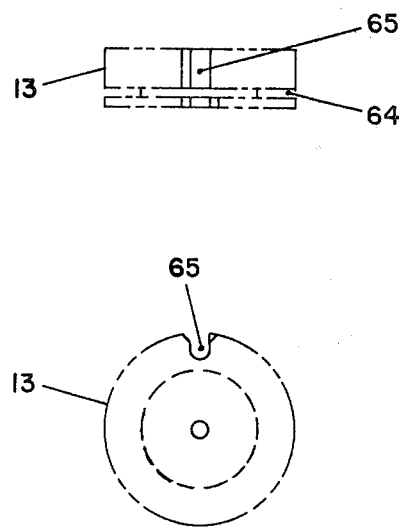
FIG. 9.
FIG. 8.

4,256,215

APPARATUS FOR ARRANGING AND TRANSPORTING ARTICLES

BACKGROUND OF THE INVENTION AND PRIOR ART STATEMENT

The invention relates to an apparatus for arranging and transporting articles, more particularly an apparatus for consecutively changing orientation of syringe assemblies and transporting the same from a first position to a second position and then to a third position.

The term "syringe assembly" as used herein is intended to include a syringe vial, a syringe needle provided at one end of the vial, an annular flange at the other end thereof and a plunger situated in the vial for injecting liquid medicament. A piston may be attached to an end plunger for providing a seal between the vial and the plunger.

The art of manufacturing and assembling syringe assemblies is well developed, so that all the members of the syringe assembly are substantially automatically assembled. In some cases, the syringe vial is sterilized and liquid medicament is filled therein. Such handling of syringe assemblies is disclosed, for example, by U.S. Pat. Nos. 3,588,985, 3,597,826, 3,623,210 and 4,118,914.

In handling the syringe assemblies, the vials or syringe assemblies are reoriented for easily performing the various steps. U.S. Pat. No. 4,076,113 and U.S. patent application Ser. No. 51,327, filed on June 22, 1979, by the same applicant as herein, disclose machines for consecutively inverting the syringe vials and transporting the same from one side to the other side. In these machines, the vertically oriented vials or syringe assemblies are completely inverted.

In performing the various steps, it is also necessary to arrange the vials or syringe assemblies transversely. Further, machines manufactured for handling each step or steps operate at various speeds, so that it is desirable to regulate feeding speed to the next machine in addition to change the orientation of the vials.

Accordingly, an object of the invention is to provide an apparatus for changing the orientation of articles transversely and transporting the same successively.

Another object of the invention is to provide an apparatus for changing the orientation of articles transversely and transporting the same successively, in which the articles fed to the apparatus at one speed are successively transported at another speed.

Further objects and advantages of the invention will be apparent from the following description of the invention.

SUMMARY OF THE INVENTION

In accordance with the invention, there is provided an apparatus for arranging and transporting articles. The apparatus comprises conveyor means for transmitting articles to a first position, a first rotation wheel having a plurality of recesses around the outer periphery thereof for consecutively receiving the articles in the recesses from the conveyor means at the first position and transmitting the articles to a second position angularly away from the first position with respect to an axis of the first wheel, and a second rotation wheel having a plurality of recesses around the outer periphery thereof. The second wheel is arranged normal to the first rotation wheel to consecutively receive the articles supported in the recesses of the first wheel at the second position and to transmit the articles to a third position angularly away from the second position with respect to an axis of the second wheel. Therefore, the articles at the first position transmitted by the conveyor means are transported to the third position, the orientation of the articles at the first position being changed and transversely positioned at the third position. The axis of the first wheel is in the longitudinally extending vertical plane of the conveyor means, and the outer surface of the first wheel is slightly inclined downwardly.

The apparatus further includes at least one support plate adjacent to the outer surface of the first wheel which extends from the first position to a position just above the second position, and at least one guide plate adjacent to the radial periphery of the second wheel which extends from the second position to the third position. The support plate serves to support the articles in the recesses of the inclined first wheel from the first position to the position just before the second position, while the guide plate acts to receive the articles from the recesses of the first wheel at the second position and support the articles in the recesses of the second wheel in transit to the third position. At the third position, the articles are transported to receiving means and are transmitted to another machine. The first wheel and the second wheel are synchronized to successively transport the articles from the first wheel to the second wheel.

The conveyor means comprises a first conveyor and a second conveyor, the first conveyor receiving the articles and transmitting the same to the second conveyor which successively transmits the articles to the first position and feeds the same to the recesses of the first wheel.

The apparatus of the invention is especially intended to arrange and transport syringe assemblies including syringe vials having syringe needles at one end and annular flanges at the other end thereof and plungers inserted into the vials for injecting liquid medicament. Therefore, the apparatus includes a first upper panel situated above the first conveyor and a guide panel adjacent to the first upper panel to provide a first slit therebetween for supporting the flanges of the syringe assemblies such that the syringe needles are pointed downwardly. The first conveyor includes an endless belt having a plurality of projections extending outwardly therefrom for transmitting the syringe assemblies in the first slit to the second conveyor.

The apparatus further includes a second upper panel situated above the second conveyor and having an elongated second slit therein adapted to support the flanges of the syringe assemblies. The second conveyor consists essentially of two endless belts rotating along the second slit, so that the syringe assemblies received from the first conveyor are transmitted to the first position, some of the syringe assemblies being stocked within the second slit and consecutively transmitted to the recesses of the first wheel. Namely, the two belts frictionally hold and carry the assemblies forwardly, and when the assemblies have been transmitted to a forward end, the belts slip relative to the assemblies.

BRIEF DESCRIPTION OF THE DRAWINGS

FIG. 3 is an enlarged plan view showing conveyor means of the apparatus taken along the line 3—3 in FIG. 1;

FIG. 4 is a side view of the conveyor means shown in FIG. 3;

FIG. 5 is an elongated perspective view taken along the line 5—5 in FIG. 1;

FIG. 6 is a front view of a first wheel of the apparatus;

FIG. 7 is a plan view of the first wheel shown in FIG. 6;

FIG. 8 is a front view of a second wheel of the apparatus;

FIG. 9 is a plan view of the second wheel shown in FIG. 8;

DETAILED DESCRIPTION OF A PREFERRED EMBODIMENT

Figures 1, 2:
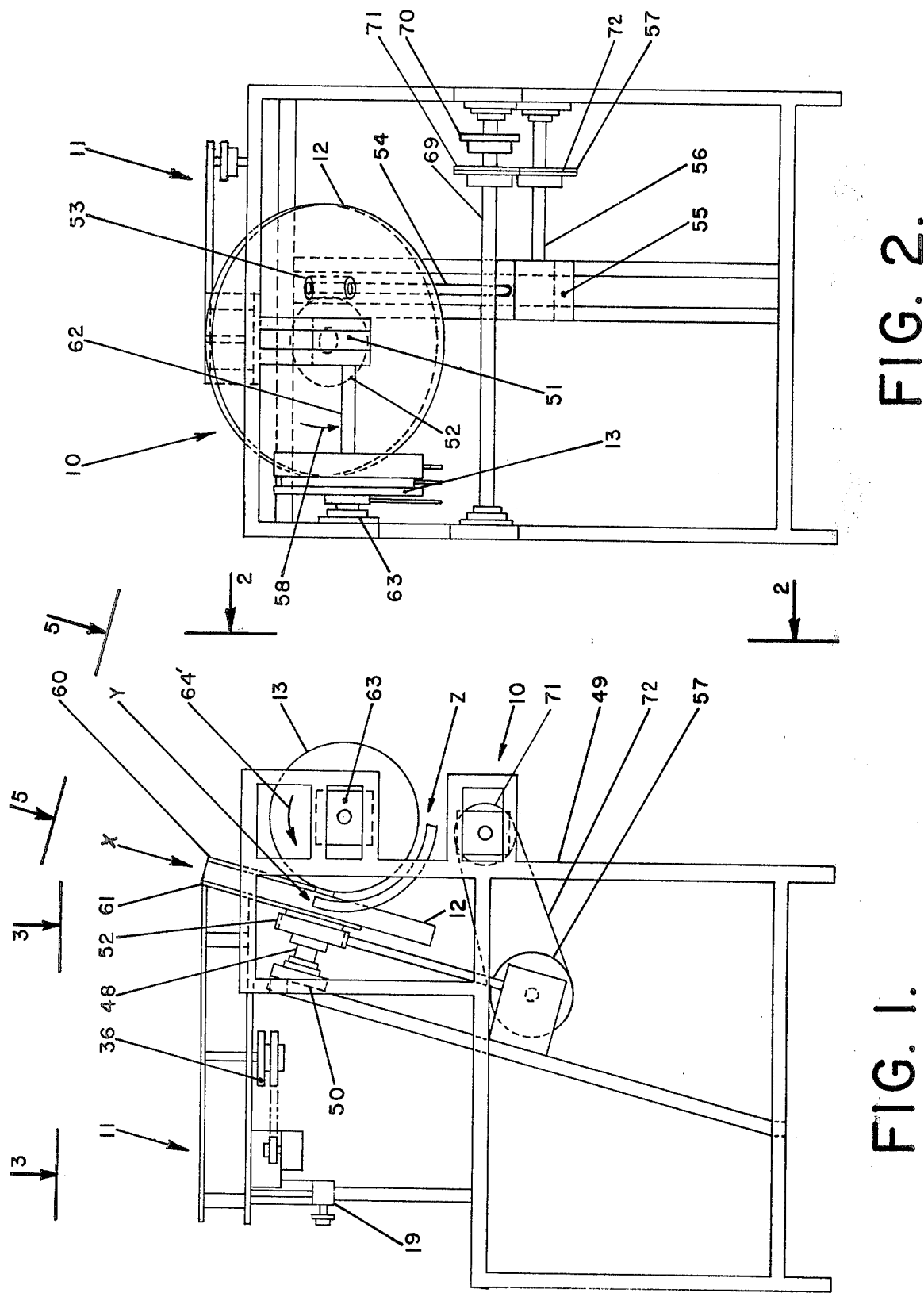
FIG. 1 is a side view of the apparatus in accordance with the invention.
FIG. 2 is a front view of the apparatus taken along the line 2—2 in FIG. 1.

An apparatus 10 in accordance with the invention shown in the drawings is especially intended to arrange and transport syringe assemblies A, each syringe assembly including a syringe vial V having a syringe needle N at one end and an annular flange F at the other end thereof and a plunger P inserted into the vial for injecting liquid medicament. A sheath S covers the needle N (see FIG. 11).

Referring to FIGS. 1 and 2, the apparatus 10 of the invention comprises conveyor means 11, a first wheel 12 and a second wheel 13. The syringe assemblies A are vertically fed to the conveyor means 11 and are transported to a first position X at which the syringe assemblies A are transferred to the first wheel 12. The first wheel 12 transmits syringe assemblies A to a second position Y at which the syringe assemblies A are transferred to the second wheel 13, the second wheel 13 transferring the assemblies A to a third position Z. The assemblies A are then transported to a receiving means (not shown).

The conveyor means 11 includes a first conveyor 14 and a second conveyor 15, which are supported by a frame 16 (see FIGS. 3 and 4). The first conveyor 14 comprises two idler sprockets 16, 17, a working sprocket 18 connected to a gear box 19 and an endless belt 20 having a plurality of projections 21 extending outwardly therefrom. The gear box 19 is connected to a motor (not shown) through a chain 22, so that when the motor operates, the belt 20 rotates in a direction shown by an arrow 23. Above the first conveyor 14, there is provided a first panel 24, and a guide panel 25 is also situated adjacent to the first panel 24 to provide a first slit 26 therebetween. The syringe assemblies A are gravity fed to the first slit 26 by means of two pairs of tracks 27 with the syringe needles N pointed downwardly. The flanges F of the syringe assemblies A are larger than the width of the slit 26, so that the syringe assemblies A fed to the slit 26 are supported by edges of the first panel 24 and the guide panel 25 and are transferred to the second conveyor 15 by the projections 21 of the belt 20.

The second conveyor 15 comprises two working sprockets 28, 29, four idler sprockets 30, 31, 32, 33 and two endless belts 34, 35, the belt 34 encircling the working sprocket 28 and the idler sprockets 30, 31, and the belt 35 encircling the working sprocket 29 and the idler sprockets 32, 33. The longitudinally extending inside portions of the belts 34, 35 are apart from each other to hold the syringe assemblies A therebetween. The working sprockets 28, 29 are mounted for co-rotation with gears 36, 37, respectively, the gears 36, 37 engaging with each other, while the working sprocket 28 is mounted for co-rotation also with a pulley 38 which is connected through a belt 41 to a pulley 39 on the drive shaft of a motor 40. Accordingly, when the motor 40 operates, the working sprockets 28, 29 rotate, so that the belts 34, 35 move in the respective directions indicated by arrows 42, 43. Support rollers 44 are vertically provided along the longitudinal direction of the belts 34, 35. Above the second conveyor 15, there are provided second and third panels 45, 46 which are apart from each other to provide a second slit 47 for supporting the flanges F of the syringe assemblies A. Therefore, when the syringe assemblies A are fed to the second conveyor 15 from the first conveyor 14, the panels 45, 46 support the flanges F of the syringe assemblies A and the belts 34, 35 hold the vials V from both sides thereof and carry the assemblies A to the first position X. When the syringe assemblies A are transferred to the second conveyor 15, the assemblies A are held in the second slit 47 and are consecutively transferred to the first position X.

At the first position X, the first wheel 12 is provided normal to the longitudinal vertical plane of the second conveyor 15 and is slightly inclined downwardly. An axis 48 of the first wheel 12 is supported by a frame 49 through a bearing 50 and a gear box 51, and includes a worm gear 52 engaging with a worm 53 connected to a rod 54 which extends to a gear box 55. The gear box 55 includes a rod 56 having a sprocket 57 rotated by means as explained hereinafter, so that when the sprocket 57 rotates, the first wheel 12 rotates as shown by arrow 58. The first wheel 12 includes a plurality of recesses 59 radially inwardly extending from the outer circular periphery thereof for receiving the syringe assemblies A vertically therein at the first position X. Edges of the recesses 59 are cut to easily receive the assemblies A and transfer the same to the second wheel 13. Adjacent to the outer surface of the first wheel 12, there is provided an outer support 60 extending from the first position X to a position just above the second position Y, and an inner support 61 is also provided adjacent to the inner surface of the wheel 12, which extends from a position just after the first position X to the second position Y. The supports 60, 61 act to hold the syringe assemblies A in the recesses 59 of the first wheel 12 from the first position X to the second position Y. The first wheel 12 serves to consecutively receive the vertically oriented syringe assemblies A from the second conveyor 15 at the first position X and transmit the same to the second position Y at which the syringe assemblies A are horizontally oriented.

At the second position Y, there is provided a second wheel 13 normal to the first wheel 12. An axis 62 of the second wheel 13 is supported by a bearing 63 connected to the frame 49 and the gear box 51, so that when the first wheel 12 rotates, the second wheel 13 rotates as well in the direction shown by arrow 64'. The second wheel 13 includes a circular depression 64 radially inwardly extending from the outer periphery thereof for receiving the flanges F of the syringe assemblies A and a plurality of recesses 65 parallel to the axis 62 around the outer periphery for receiving the syringe vials V and plungers P of the syringe assemblies A laterally.

Figure 11:
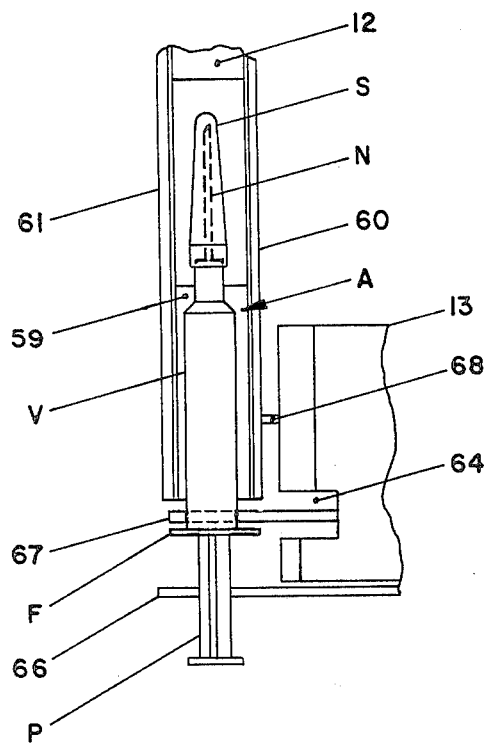
FIG. 11 is a partial cross section view taken along the line 11—11 in FIG. 10.
Figure 10:
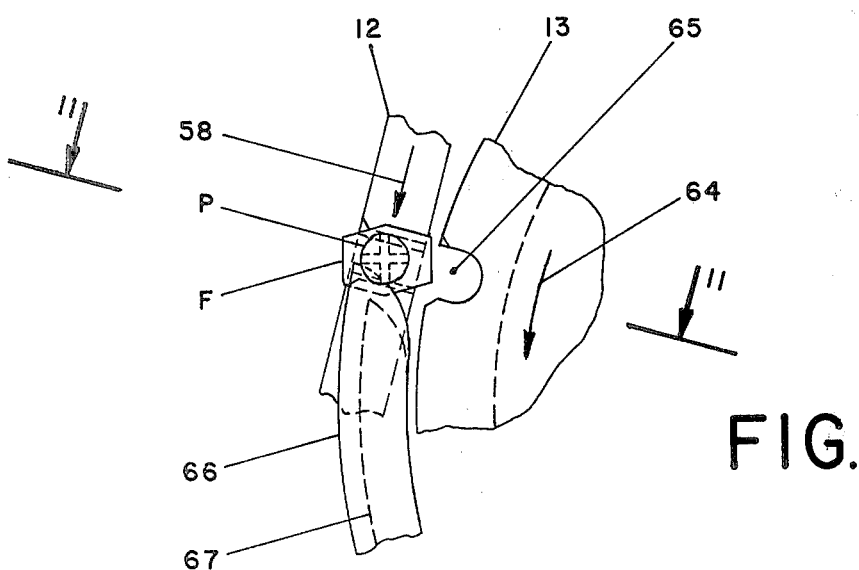
FIG. 10 is an enlarged view taken along the line 10—10 in FIG. 5.

Guide plates 66, 67, 68 are provided adjacent to the radial periphery of the second wheel 13 extending from the second position Y to the third position Z for receiving the syringe assemblies A from the first wheel 12 and supporting the same in the recesses 65 until the third position Z. When the syringe assemblies A are transferred to the second position Y by the first wheel 12, the guide plate 66 at first contacts the plungers P of the syringe assemblies A. At that time, the assemblies A move slightly laterally as shown in FIG. 11, then the guide plate 67 contacts and supports the syringe vials V. The guide plate 68 finally supports the assemblies A.

A rod 69 and a sprocket 70 for rotating the same, which are parts of the receiving means, are provided below the second wheel 13. The rod 69 is rotationally driven by an endless chain (not shown) engaging the sprocket 70 and a like sprocket (not shown) on a rotationally driven shaft (not shown) of the next machine, specifically, a labelling machine, to which the syringe assemblies A are transported. A sprocket 71 is also provided on the rod 69 and is connected to the sprocket 57 by means of a chain 72. Accordingly, when the rod 69 rotates, the rod 56 rotates as well to thereby rotate the first and second wheels 12, 13. An endless belt (not shown) is attached to the rod 69, so that when the syringe assemblies A are transferred to the third position Z, the belt receives the assemblies A and further transports the same to the next machine.

The invention has been described with reference to a specific embodiment, but it is to be noted that the description is illustrative and the invention is limited only by the appended claims.

What is claimed is:

1. An apparatus for arranging and transporting elongated articles, comprising conveyor means for receiving said articles and transferring them with vertical orientation to a first position, a first rotatable wheel in a substantially vertical plane substantially normal to the longitudinal direction of said conveyor means, said first rotatable wheel having a plurality of first recesses distributed about its outer periphery, said first recesses extending radially inwardly from the outer periphery of the first rotatable wheel for consecutively receiving the vertically oriented articles in the recesses from the conveyor means at the first position and transferring the articles to a second position, the second position being substantially 90 degrees from the first position in the direction of rotation of the first wheel, and a second rotatable wheel in a substantially vertical plane normal to the plane of the first rotatable wheel, said second rotatable wheel having a plurality of second axially extending recesses distributed about its outer periphery, said second recesses being formed to consecutively receive said articles from the first recesses at the second position and transferring the articles to a third position angularly displaced from the second position with respect to the axis of the second wheel, whereby the vertically oriented articles transferred to the first position by the conveyor means are transferred to the second position and then to the third position at which the articles are oriented transversely.

2. The apparatus of claim 1, in which the outer surface of the first wheel is slightly inclined to the vertical, and at least one support plate is provided adjacent to the outer surface of the first wheel, the support plate extending from the first position to a position just above the second position.

3. Apparatus as claimed in claim 2, including at least one guide plate adjacent to the radial periphery of the second wheel, the guide plate extending from the second position to the third position to receive the articles from the first wheel at the second position and to support the same until the third position.

4. Apparatus as claimed in claim 3, in which the first wheel and the second wheel are synchronized to successively transport the articles from the first wheel to the second wheel.

5. Apparatus as claimed in claim 4, further including receiving means for receiving the articles at the third position and further transferring the articles.

6. Apparatus as claimed in claim 3, in which said conveyor means comprises a first conveyor and a second conveyor, said first conveyor receiving the articles and transferring the same to the second conveyor, the second conveyor transferring the articles to the first position and feeding the articles to the recesses of the first wheel.

7. Apparatus as claimed in claim 6 wherein the articles comprise syringe assemblies including syringe vials having syringe needles at one end and annular flanges at the other end thereof and plungers inserted into the vials for injecting liquid medicament, further including a first upper panel situated above the first conveyor and a guide panel adjacent to the first upper panel to provide a first slit therebetween for supporting the flanges of the syringe assemblies with the syringe needles are pointed downwardly, said first conveyor including an endless belt having a plurality of projections extending outwardly therefrom for transferring the syringe assemblies in the first slit to the second conveyor.

8. Apparatus as claimed in claim 7, further including a second upper panel situated above the second conveyor and having an elongated second slit therein adapted to support the flanges of the syringe assemblies, said second conveyor consisting essentially of two endless belts rotating along the second slit, whereby the syringe assemblies received from the first conveyor are transmitted to the first position, some of the syringe assemblies being stocked within the second slit and transferred to the recesses of the first wheel consecutively.

* * * * *